United States Patent
Black et al.

(10) Patent No.: US 10,144,653 B2
(45) Date of Patent: Dec. 4, 2018

(54) FLUID METERING SYSTEM

(71) Applicant: FlowCore Systems, LLC, Williston, ND (US)

(72) Inventors: Charles D. Black, Williston, ND (US); Wesley F. Black, Williston, ND (US); Steven E. Hayden, Williston, ND (US)

(73) Assignee: FlowCore Systems, LLC, Williston, ND (US)

(*) Notice: Subject to any disclaimer, the term of this patent is extended or adjusted under 35 U.S.C. 154(b) by 1093 days.

(21) Appl. No.: 14/503,889

(22) Filed: Oct. 1, 2014

(65) Prior Publication Data

US 2015/0090645 A1 Apr. 2, 2015

Related U.S. Application Data

(60) Provisional application No. 61/885,152, filed on Oct. 1, 2013.

(51) Int. Cl.
*G01F 1/00* (2006.01)
*C02F 1/00* (2006.01)
(Continued)

(52) U.S. Cl.
CPC ............. *C02F 1/008* (2013.01); *B01F 3/088* (2013.01); *B01F 3/0865* (2013.01); *B01F 15/00285* (2013.01); *B01F 15/0462* (2013.01); *C02F 1/686* (2013.01); *G05D 11/132* (2013.01); *C02F 2103/10* (2013.01); *C02F 2201/005* (2013.01); *C02F 2209/006* (2013.01);
(Continued)

(58) Field of Classification Search
CPC ........ C02F 1/008; C02F 1/685; B01F 3/0865; B01F 3/088; B01F 15/00285; B01F 15/0462; G05D 11/02; G05D 11/08

USPC ........................................................ 210/96.1
See application file for complete search history.

(56) References Cited

U.S. PATENT DOCUMENTS 4,282,093 A 8/1981 Haga
4,538,445 A 9/1985 Kenik
(Continued)

FOREIGN PATENT DOCUMENTS

KR 10-2013-0066108 6/2013

OTHER PUBLICATIONS

PCT Search Report Received from the international Searching Authority; Received and Printed on Jan. 6, 2015.
(Continued)

*Primary Examiner* — Robert Clemente
*Assistant Examiner* — Akash K Varma
(74) *Attorney, Agent, or Firm* — Neustel Law Offices

(57) ABSTRACT

A fluid metering system for accurately and consistently mixing two or more fluids together. The fluid metering system generally includes a closed loop feedback system that monitors the flow rate of the water and the volume of liquid chemical added to the water over a period of time. Based on the measured amount of chemical added to the water over a period of time, the system calculates whether or not an adjustment is required for the next addition of chemical to the water. The present invention utilizes a measuring tube that is filled with a chemical wherein a pressure sensor measures the pressure of the chemical in the measuring tube when filled and after being emptied to calculate the total volume of chemical added to the water.

20 Claims, 6 Drawing Sheets

(51) Int. Cl.
*C02F 1/68* (2006.01)
*G05D 11/13* (2006.01)
*B01F 15/00* (2006.01)
*B01F 15/04* (2006.01)
*B01F 3/08* (2006.01)
*C02F 103/10* (2006.01)
*G01F 23/14* (2006.01)

(52) U.S. Cl.
CPC .... *C02F 2209/008* (2013.01); *C02F 2209/03* (2013.01); *C02F 2209/42* (2013.01); *C02F 2303/04* (2013.01); *C02F 2303/08* (2013.01); *C02F 2303/22* (2013.01); *G01F 23/14* (2013.01)

(56) References Cited

U.S. PATENT DOCUMENTS

| | | | | |
|---|---|---|---|---|
| 4,648,043 | A * | 3/1987 | O'Leary | B01F 15/00227 137/93 |
| 6,074,551 | A | 6/2000 | Jones | |
| 6,129,104 | A * | 10/2000 | Ellard | C02F 3/006 137/3 |
| 6,200,466 | B1 | 3/2001 | Bender | |
| 6,773,611 | B2 * | 8/2004 | Perlich | B63J 4/002 210/143 |
| 6,981,553 | B2 | 1/2006 | Stegemeier | |
| 7,263,448 | B2 | 8/2007 | Brown | |
| 7,955,853 | B2 | 6/2011 | Hicks | |
| 8,066,940 | B2 * | 11/2011 | Denkewicz, Jr. | C02F 1/325 210/748.01 |
| 8,515,581 | B2 | 8/2013 | Piironen | |
| 8,532,829 | B2 | 9/2013 | Haller | |
| 2004/0149436 | A1 | 8/2004 | Sheldon | |
| 2009/0112364 | A1 * | 4/2009 | Chen | C02F 1/686 700/266 |
| 2011/0241230 | A1 | 10/2011 | Kerfoot | |
| 2013/0068532 | A1 | 3/2013 | Bansal | |
| 2013/0126152 | A1 | 5/2013 | Banks | |
| 2013/0153231 | A1 * | 6/2013 | Ayres | G05D 7/0635 166/305.1 |
| 2013/0192841 | A1 | 8/2013 | Feasey | |

OTHER PUBLICATIONS http://www.enbasesolutions.com/index.php; Chemical Automation System from Enbase Solutions; Received and Printed on Sep. 30, 2014.
Wave Control Systems Ltd Uninterruptable Chemical Supply System Operational Brochure; Prior to Application Filing Date.
http://wavecontrol.ca/our-products/chemical-injection-metering-and-monitoring-pa ckages/; Wave Control Systems Ltd Webpage; Prior to Application Filing Date.
http://www.profireenergy.com/products/PC180_fuel_package.html; Profire Energy PC180 Full Tank Package Webpage; Prior to Application Filing Date.
http://www.graco.com/us/en/products/business-unit/ong.html; Graco Oil & Natural Gas Product Webpage; Prior to Application Filing Date.

* cited by examiner

FLUID METERING SYSTEM

CROSS REFERENCE TO RELATED APPLICATIONS

I hereby claim benefit under Title 35, United States Code, Section 119(e) of U.S. provisional patent application Ser. No. 61/885,152 filed Oct. 1, 2013. The 61/885,152 application is currently pending. The 61/885,152 application is hereby incorporated by reference into this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a fluid mixing meter and more specifically it relates to a fluid metering system for accurately and consistently mixing two or more fluids together.

Description of the Related Art

Any discussion of the related art throughout the specification should in no way be considered as an admission that such related art is widely known or forms part of common general knowledge in the field.

Mixing two or more fluids together in an accurate ratio is required in many different applications such as, but not limited to, treating water used in the oil drilling industry. One example of water used in the oil drilling industry involves where water is injected into an oil well to dilute salt water that exists in the oil well. To further the example, a water pump may be activated for 10 minutes to inject water into the oil well, deactivated for 23 minutes, activated again for 10 minutes and so forth in a cycling manner based on the set parameters for the oil well. It is important to chemically treat the water prior to injection into the well with liquid chemicals such as, but not limited to, scale inhibitors, corrosion inhibitors, desalination chemicals, biocides and various other liquid additives. Often times the chemicals added to the water are in very small amounts such as 5 parts per million (ppm) to over 1,000 ppm. It is important to ensure that the minimum required amount of chemical is added to the water while at the same time preventing excessive chemical usage.

One conventional system for dosing the water used in oil wells utilizes conventional chemical metering pumps that dispense small doses of chemical into the water. A conventional metering pump may be comprised of various types of pumps (e.g. piston pumps) that discharge a desired flow rate of liquid chemical when averaged over time within a discharge pressure range.

However, conventional metering pumps are inherently inaccurate thereby requiring the operator to set the metering pump to a chemical input level that exceeds the desired ratio of chemical per water. The excess chemical is wasted resulting in extra unnecessary expense to the operator and potentially damaging the environment.

Another problem with conventional metering pumps is that they are prone to air lock resulting in no chemical being added to the water. When no chemical is added to the water for a period of time, damage to the oil well equipment can occur because of salt accumulation and corrosion.

Another problem with conventional metering pumps is they are not designed to adjust to the flow rate of water which may change over time. In addition, the flow rate of chemical emitted by the conventional metering pumps may also change over time resulting in increased or decreased chemical added to the water.

Because of the inherent problems with the related art, there is a need for a new and improved fluid metering system for accurately and consistently mixing two or more fluids together.

BRIEF SUMMARY OF THE INVENTION

The invention generally relates to a fluid metering system which includes a closed loop feedback system that monitors the flow rate of the water and the volume of liquid chemical added to the water over a period of time. Based on the measured amount of chemical added to the water over a period of time, the system calculates whether or not an adjustment is required for the next addition of chemical to the water. The present invention utilizes a measuring tube that is filled with a chemical wherein a pressure sensor measures the pressure of the chemical in the measuring tube thereby allowing a control unit to calculate the total volume of chemical in the measuring tube. After chemical is input into the water from the measuring tube, the pressure sensor measures the remaining volume of chemical in the measuring tube to determine the total volume of chemical added to the water. There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
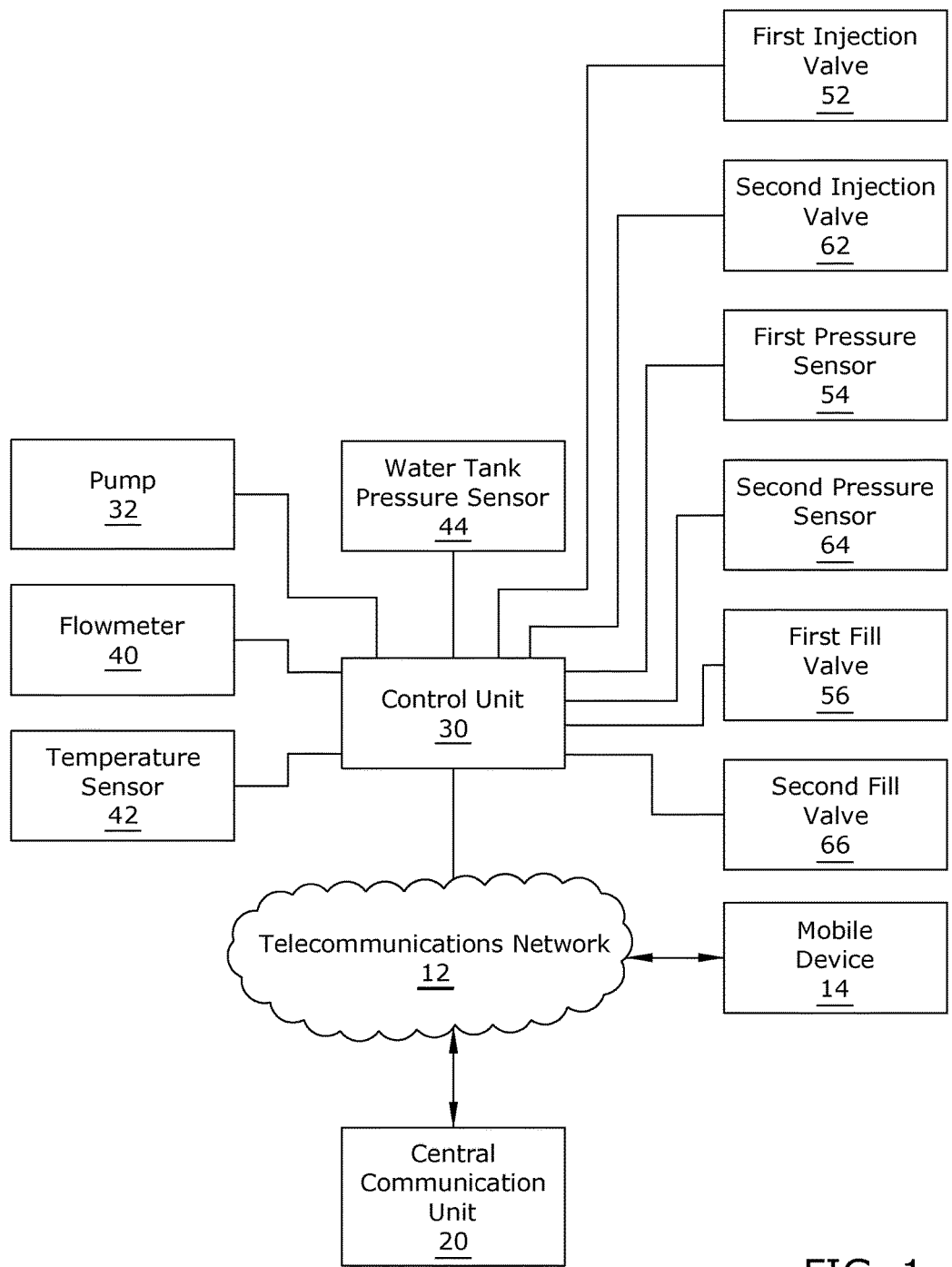
FIG. 1 is a block diagram illustrating the communications between the various components of the present invention.

A. Overview of Invention.

FIGS. 1 through 6 illustrate the present invention. The fluid metering system generally includes a closed loop feedback system that monitors the flow rate of the water and the volume of liquid chemical added to the water over a period of time. Based on the measured amount of chemical added to the water over a period of time, the system calculates whether or not an adjustment is required for the next addition of chemical to the water. The present invention utilizes a measuring tube that is filled with a chemical wherein a pressure sensor measures the pressure of the chemical in the measuring tube thereby allowing a control unit 30 to calculate the total volume of chemical in the measuring tube. After chemical is input into the water from the measuring tube, the pressure sensor measures the remaining volume of chemical in the measuring tube to determine the total volume of chemical added to the water. The chemical in the measuring tube is isolated from the overall system to provide for accurate measurements of the amount of chemical in the measuring tube.

The present invention is preferably utilized within water treatment systems that treat water prior to injection into an oil well 18, however, the present invention may be utilized in any application where a first liquid needs to be accurately combined with a second liquid. The present invention may be utilized with one, two or more additive tanks 58, 68 depending upon the number of chemicals needed to be added to the main fluid. In addition, the present invention may be utilized to treat water for one, two or more oil wells 18.

B. Exemplary Telecommunications Networks.

The present invention may be utilized upon any telecommunications network 12 capable of transmitting data including voice data and other types of electronic data. Examples of suitable telecommunications networks 12 for the present invention include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The present invention may communicate via a single telecommunications network 12 or multiple telecommunications networks 12 concurrently. Various protocols may be utilized by the electronic devices for communications such as but not limited to HTTP, SMTP, FTP and WAP (wireless Application Protocol). The present invention may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The present invention may also be utilized with online services and internet service providers.

The Internet is an exemplary telecommunications network 12 for the present invention. The Internet is comprised of a global computer network having a plurality of computer systems around the world that are in communication with one another. Via the Internet, the computer systems are able to transmit various types of data between one another. The communications between the computer systems may be accomplished via various methods such as but not limited to wireless, Ethernet, cable, direct connection, telephone lines, and satellite.

C. Central Communication Unit.

The central communication unit 20 may be comprised of any central communication site where communications are preferably established with. The central communication units 20 may be comprised of a server computer, cloud based computer, virtual computer, home computer or other computer system capable of receiving and transmitting data via IP networks and the telecommunication networks 12. As can be appreciated, a modem or other communication device may be required between each of the central communication units 20 and the corresponding telecommunication networks 12. The central communication unit 20 may be comprised of any electronic system capable of receiving and transmitting information (e.g. voice data, computer data, etc.).

D. Mobile Device.

The mobile device 14 may be comprised of any type of computer for practicing the various aspects of the present invention. For example, the mobile device 14 can be a personal computer (e.g. APPLE® based computer, an IBM based computer, or compatible thereof) or tablet computer (e.g. IPAD®). The mobile device 14 may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The mobile device 14 may comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the present invention. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor together with an operating system operate to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

E. Main Tank.

Figure 2:
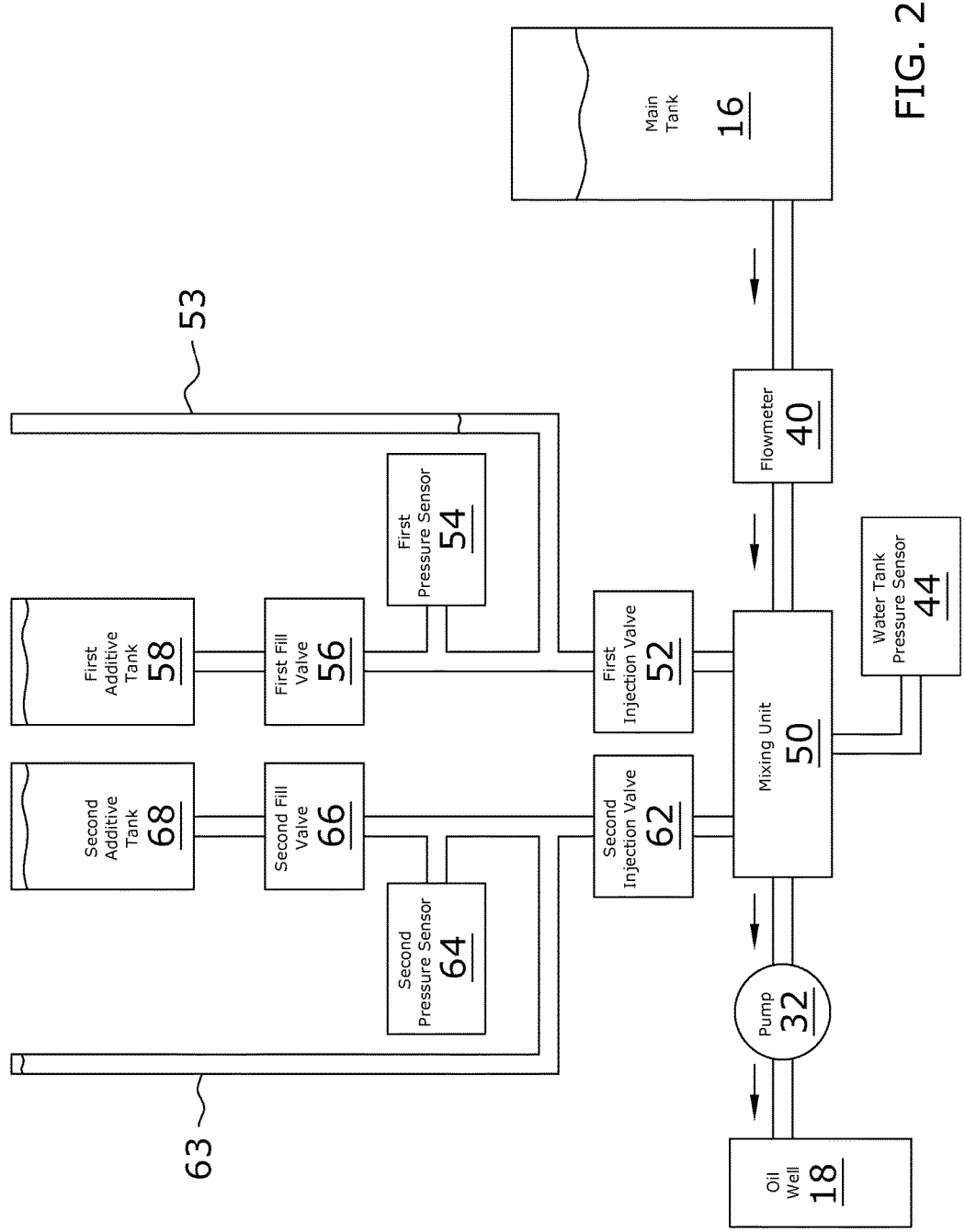
FIG. 2 is a block diagram illustrating the fluid communications between the various components of the present invention utilizing a mixing unit.
Figure 3:
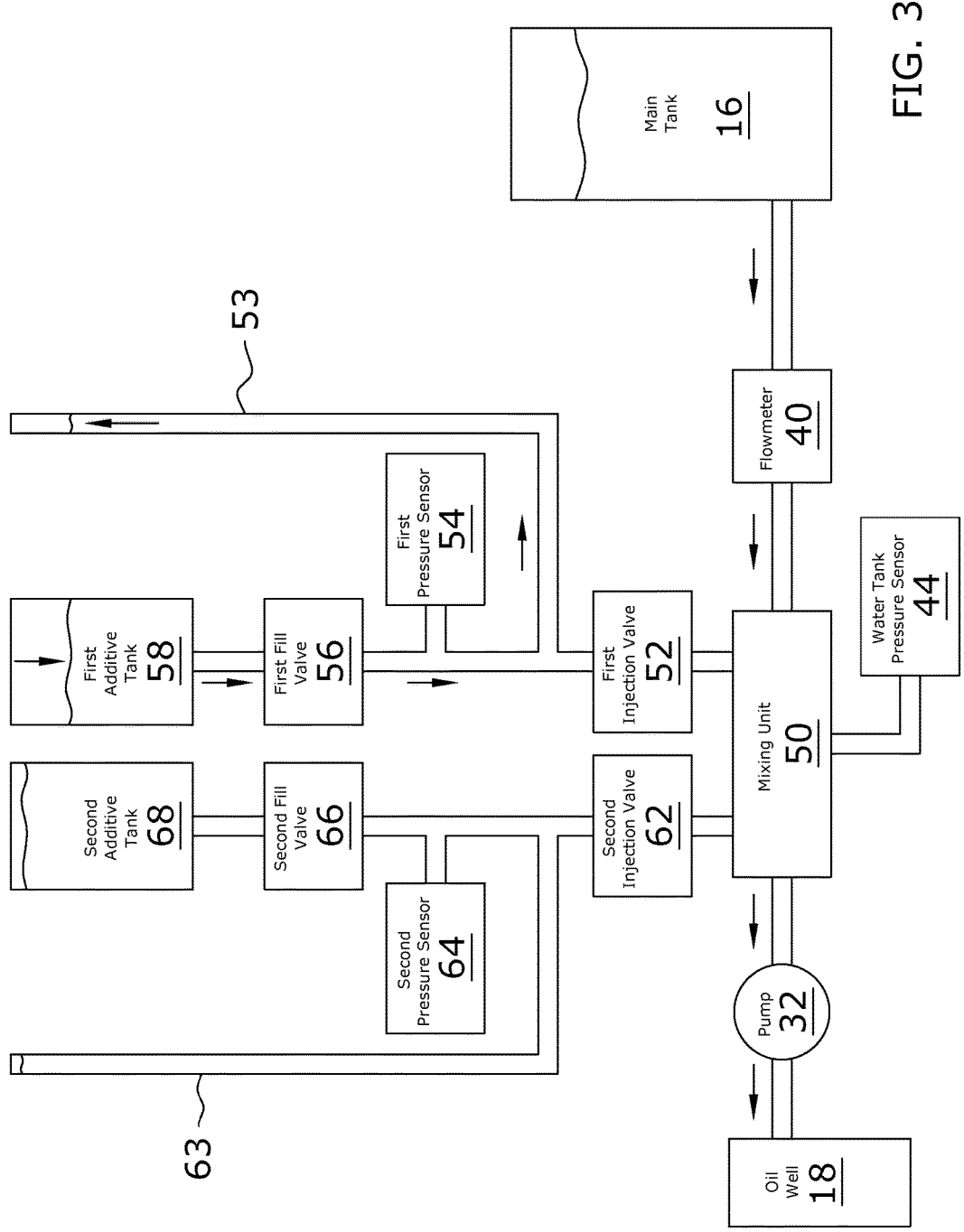
FIG. 3 is a block diagram illustrating the filling process wherein the first measuring tube is filled with the first fluid.
Figure 4:
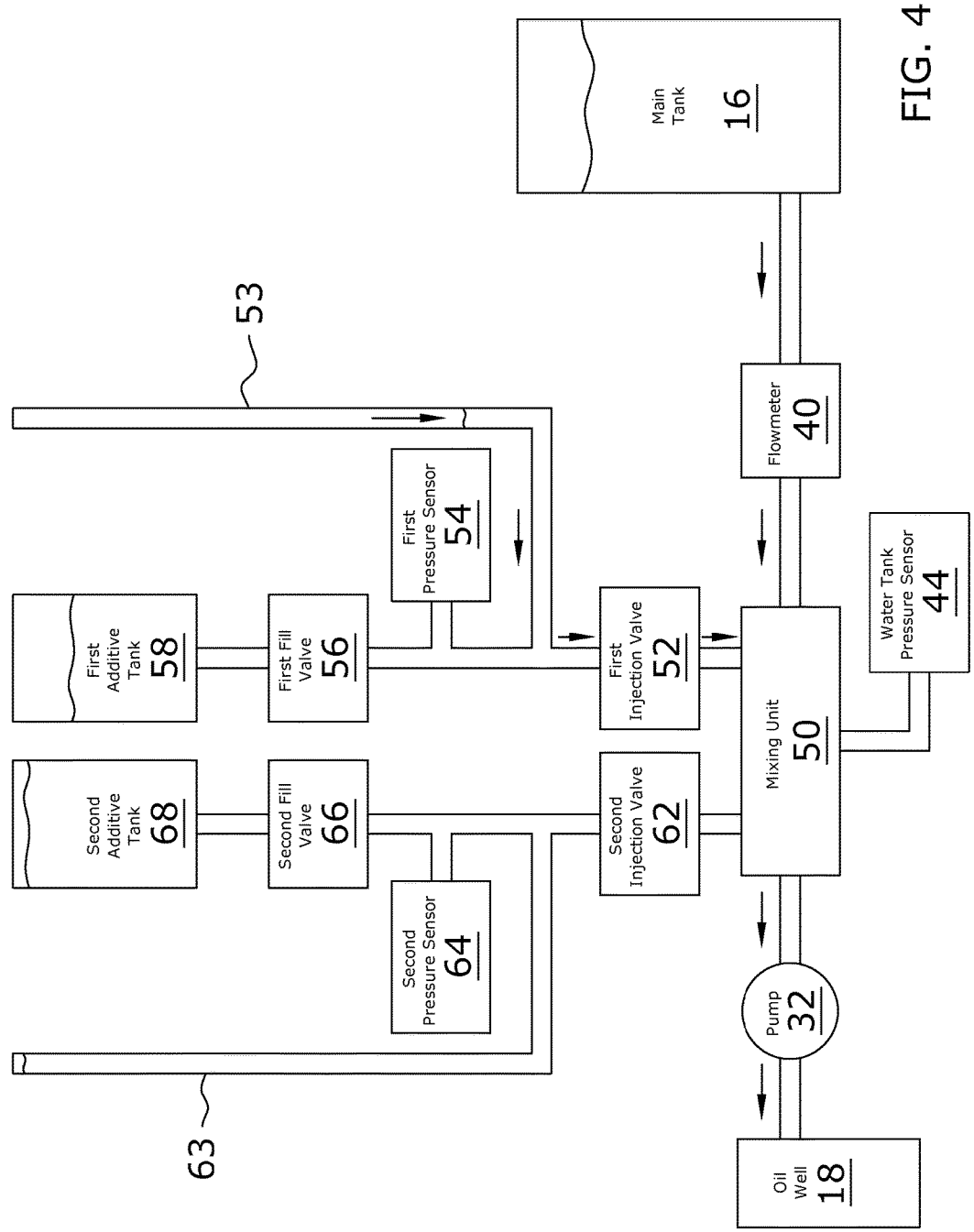
FIG. 4 is a block diagram illustrating the dosage process wherein the first fluid is dispensed from the first measuring tube into the mixing unit.
Figure 5:
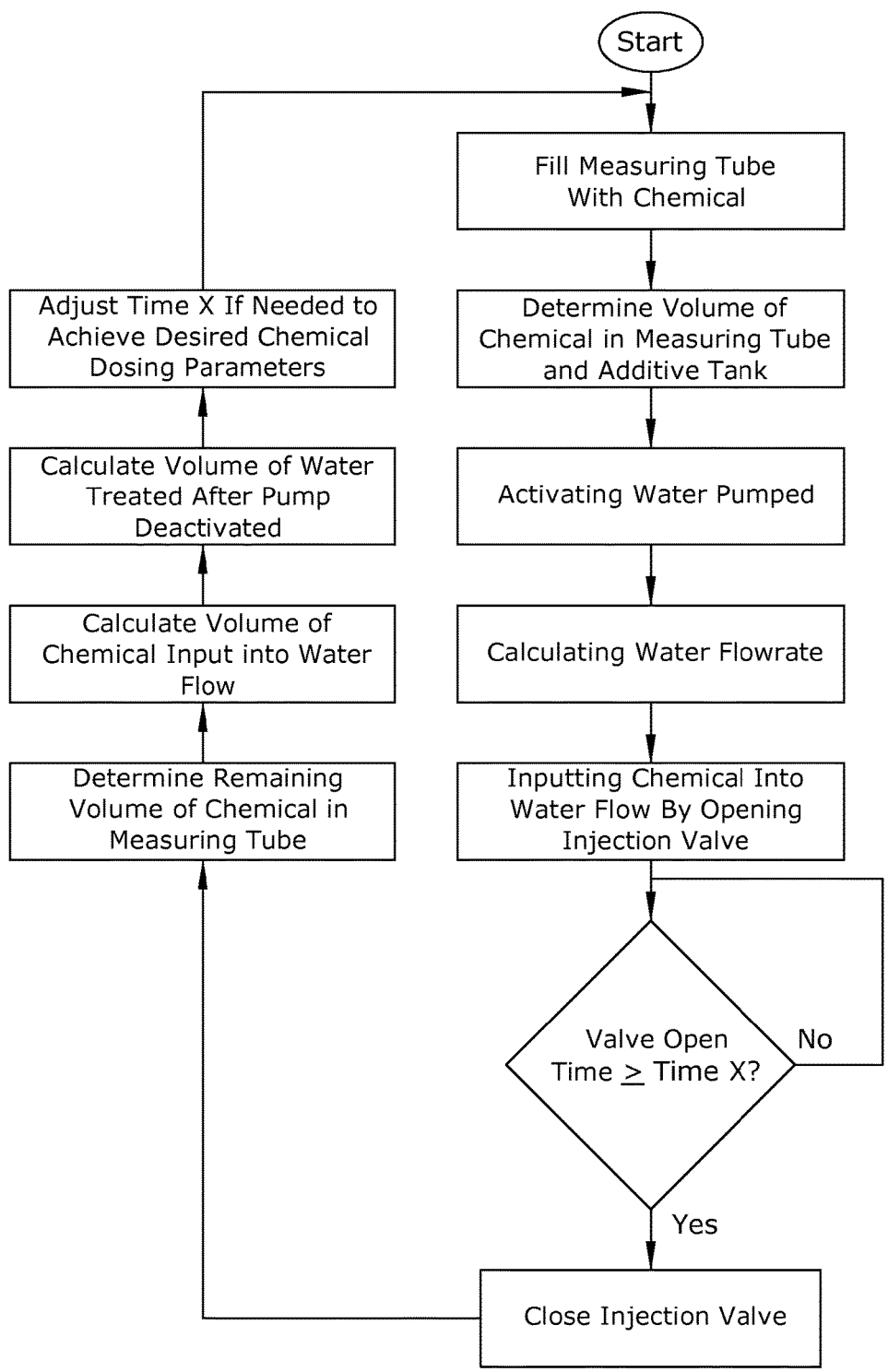
FIG. 5 is a flowchart illustrating the overall functionality of the present invention.
Figure 6:
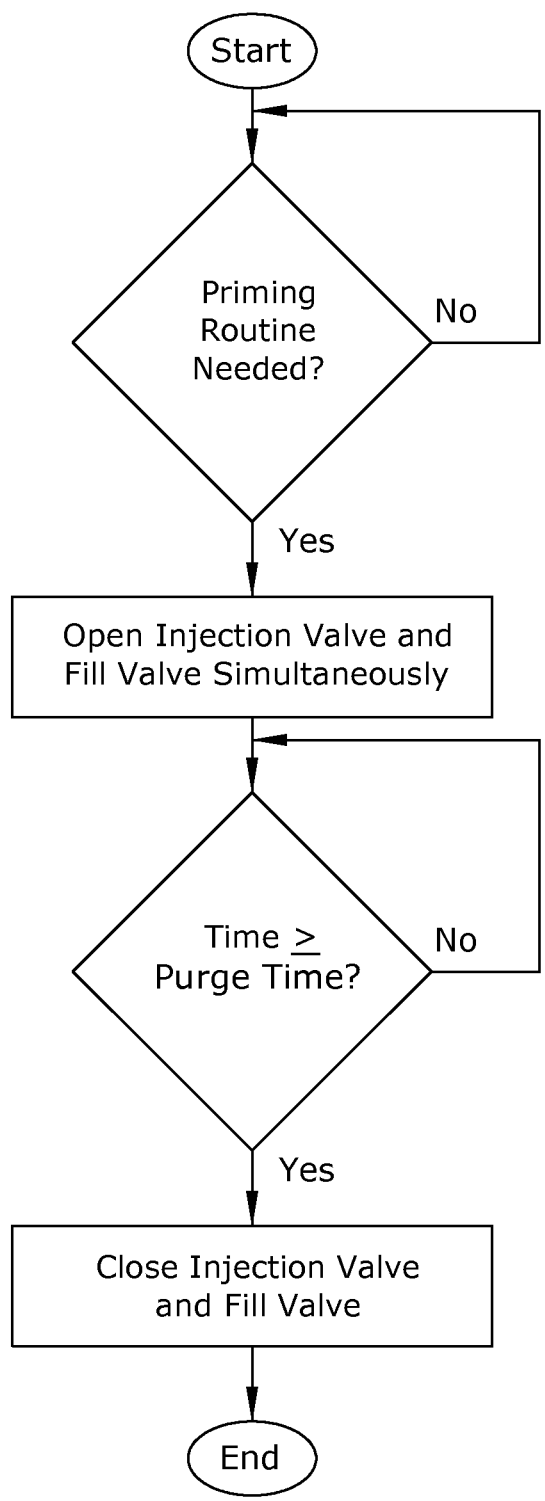
FIG. 6 is a flowchart illustrating the priming routing to purge air from the system.

FIGS. 2 through 4 illustrate the main tank 16 which stores a main fluid such as, but not limited to, water. The storage volume for the main tank 16 is preferably significantly larger than the storage volume for the additive tanks 58, 68. The main tank 16 may be comprised of a stationary tank, a mobile tank, a pressurized fluid source such as a municipal water supply system or the like. The phrase "main tank 16" as used herein is not limited to a conventional liquid tank and may be comprised of any device or system capable of providing the main fluid for chemical treatment.

A flowmeter 40 is fluidly connected to the mixing unit 50 and in communication with the control unit 30 to provide a flow rate of the main fluid to the control unit 30 thereby allowing for the calculation of the total volume of main fluid that has passed through the flowmeter 40 over a period of time. The flowmeter 40 is preferably fluidly connected between the main tank 16 and the mixing unit 50 as illustrated in FIGS. 2 through 4, however, the flowmeter 40 may be positioned on the discharge side of the mixing unit 50. A water tank pressure sensor 44 is fluidly connected to the mixing unit 50 to determine the water level within the main tank 16. The water tank pressure sensor 44 is in communication with the control unit 30 as illustrated in FIG. 1 of the drawings.

F. Mixing Unit.

FIGS. 2 and 3 further illustrate the mixing unit 50 fluidly connected to the main tank 16 and to the additive tanks 58, 68. The mixing unit 50 may be comprised of a manifold or a venturi tube.

It is preferable to utilize the venturi tube for the mixing unit 50 to provide a negative pressure that draws in the first fluid from the first measuring tube 53 and the second fluid from the second measuring tube 63. When utilizing a venturi tube for the mixing unit 50, the venturi tube may be fluidly connected in a bypass waterline thereby reducing the pressure drop in the main water line. In addition, a valve can be placed in the main water line to force water to flow more rapidly through the venturi tube in the bypass line to increase the suction at the inlet ports of the venturi tube. Alternatively, the bypass line with the venturi tube within could be positioned either before or after the water pump 32 as opposed to being placed parallel to the water pump 32.

G. Pump.

FIG. 2 further illustrates a pump 32 fluidly connected to the mixing unit 50. The pump 32 may be comprised of any device capable and adapted to moving a volume of liquid. The pump 32 is in communication with the control unit 30 and may be controlled by the control unit 30 or another control device.

The intake of the pump 32 is fluidly connected to the outlet of the mixing unit 50. The outlet of the pump 32 is fluidly connected to the oil well 18 to inject the chemically treated water into the oil well 18. As is well known in the oil industry, a first volume of chemically treated water is injected into the oil well 18 (e.g. 30 barrels) and a second volume of dilute well water is pumped out (e.g. 120 barrels). When applying a desired chemical treatment ratio, the user calculates the amount of water to be treated based on the total volume of water being removed from the oil well 18. The water being injected into the well 18 acts as a carrier for the total volume of water to be treated.

H. First Chemical Additive System.

FIG. 2 illustrates a first additive tank 58 capable and adapted for storing a volume of the first fluid. The first additive tank 58 may be comprised of any tank capable of storing fluid. The first fluid is comprised of a liquid water treatment chemical for treating the water prior to injection into an oil well 18 such as, but not limited to, a scale inhibitor, a corrosion inhibitor, a desalination chemical and/or a biocide.

The first additive tank 58 is fluidly connected to the mixing unit 50 with the first fill valve 56 and the first injection valve 52 fluidly connected inline between thereof as shown in FIG. 2 of the drawings. The first fill valve 56 and the first injection valve 52 selectively isolate the first additive tank 58 from the mixing unit 50 to allow for filling and dispensing of the measuring tube.

As further shown in FIG. 2, the first measuring tube 53 is fluidly connected to the first additive tank 58. The first fill valve 56 is fluidly connected between the first measuring tube 53 and the first additive tank 58 to allow for isolation of the first fluid within the first measuring tube 53 after being filled and during dispensing of the first fluid from the first measuring tube 53 into the mixing unit 50.

The first measuring tube 53 is comprised of an upwardly angled tube and further is preferably substantially vertically orientated as illustrated in FIG. 2 of the drawings. The first measuring tube 53 is fluidly connected to the first additive tank 58 such that when the first fill valve 56 is opened, the fluid level within the first measuring tube 53 is approximately the same as the fluid level within the first additive tank 58 as illustrated in FIG. 3 of the drawings.

The first measuring tube 53 is preferably comprised of a small width tube. The first measuring tube 53 may have various internal cross sectional shapes for the internal passage such as circular, square, rectangular, oval and the like. However, it is preferable that the first measuring tube 53 be comprised of a constant interior cross sectional shape and further is preferably comprised of a circular interior shape to provide for relatively simple calculation of the volume of liquid within the first measuring tube 53. The first measuring tube 53 preferably has an interior width of less than 0.5 inches and has a vertical length of at least 2 feet. The first measuring tube 53 further preferably has a circular cross sectional shape, an interior diameter of approximately 0.375 inches and a vertical length of approximately 3 feet. The small diameter of the measuring tube combined with the long length of the tube allows for accurate measurement of the liquid within the first measuring tube 53 after filling the first measuring tube 53 and after dispensing the liquid from the first measuring tube 53.

The first fill valve 56 is fluidly connected between the first additive tank 58 and the first measuring tube 53 as shown in FIG. 2. The first injection valve 52 is fluidly connected between the first measuring tube 53 and the mixing unit 50 as further shown in FIG. 2. The first fill valve 56 and the first injection valve 52 may be comprised of any electronic valve electrically controllable by the control unit 30. The first fill valve 56 and the second fill valve 66 each have an open state to allow for liquid flow and closed state to prevent liquid flow with respect to each valve. The first fill valve 56 and the first injection valve 52 are independently controlled by the control unit 30.

A first sensor 54 is fluidly connected to the first measuring tube 53 to determine a first fluid level of the first fluid within the first measuring tube 53. The first sensor 54 is in communication with the control unit 30 and transmits to the control unit 30 the first fluid level within the first measuring tube 53 either periodically, continuously and/or upon request of the control unit 30. The first sensor is preferably comprised of a first pressure sensor 54 that measures a first pressure of the first fluid within the first measuring tube 53. The first pressure sensor 54 is preferably fluidly connected to a bottom, a lower portion or below the first measuring tube 53 to acquire an accurate reading of the total volume of fluid within the first measuring tube 53.

I. Second Chemical Additive System.

As discussed previously, the present invention may add one, two or more liquid chemicals into the main fluid from the main tank 16. FIG. 2 illustrates the usage of a second additive tank 68 storing a second fluid (the second fluid is preferably different from the first fluid but they may be the same), a second measuring tube 63, a second fill valve 66, a second pressure sensor 64, and a second injection valve 62 similar to the first chemical additive system discussed previously. The configuration and operation of the second chemical additive system is the same as the first chemical additive system with the exception of different chemical ratios for different types of liquid chemicals.

J. Control Unit.

The control unit 30 may be comprised of any type of computer for practicing the various aspects of the present invention including a conventional computer. For example, the control unit 30 can be an industrial automation controller, a programmable logic controller (PLC), a personal computer (e.g. APPLE® based computer, an IBM based computer, or compatible thereof) or tablet computer (e.g. IPAD®). The control unit 30 may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The control unit 30 is in communication with the first fill valve 56 and the first injection valve 52 as shown in FIG. 1 of the drawings. The control unit 30 controls the state of the first fill valve 56 and the first injection valve 52 for a fill process, a dosage process and a priming process as discussed herein. The below discussion discusses the first chemical additive system, but it can be appreciated that the same functionality is used for the second chemical additive system and any additional chemical additive systems. The control unit 30 has a first cycle of the fill process and the dosage process followed by a second cycle, a third cycle, a fourth cycle, a fifth cycle and so forth of the fill process and the dosage process.

K. Fill Process.

The fill process involves filling the first measuring tube 53 so that the first measuring tube 53 includes a volume of liquid similar to the first additive tank 58 as shown in FIG. 3. During the fill process, the control unit 30 opens the first fill valve 56 and closes the first injection valve 52 thereby filling the first measuring tube 53 with the first fluid from the first additive tank 58 in isolation from the mixing unit 50 using only the fluid pressure from the first additive tank 58 which eventually equals out when the respective fluid levels are the same as shown in FIG. 3. The fill process is set to last a period of time sufficient to fill the first measuring tube 53 assuming the first measuring tube 53 was empty and the first additive tank 58 completely full. Alternatively, the fill process may be set to last a period of time determined to generally allow an approximate volume of first fluid into the first measuring tube 53 (e.g. 4 cubic inches).

L. Dosage Process.

The dosage process involves dispensing all or a portion of the first fluid within the first measuring tube 53 into the main fluid within the mixing unit 50. During the dosage process, the control unit 30 closes the first fill valve 56 and then opens the first injection valve 52 thereby adding the first fluid from the first measuring tube 53 to the main fluid within the mixing unit 50 as shown in FIG. 4 of the drawings. During the dosage process, the control unit 30 opens the first injection valve 52 for an open time period sufficient to release an estimated volume of the first fluid. The first fluid is preferably drawn into the mixing unit 50 with the negative pressure created from the pump 32. Hence, there is no need for a metering pump to provide the first fluid for adding to the water being treated.

During the first cycle of the dosage process, a predetermined time such as 0.5 seconds may be used for the open time period. The open time period used to keep the first injection valve 52 open may be any time needed to dispense the desired volume of first fluid such as less than ⅛ of a second to more than 1 second.

M. Priming Process.

The priming process removes air and other gasses from the system. During the priming process, the control unit 30 opens the first fill valve 56 and opens the first injection valve 52 while the pump 32 is operating to purge gases from the chemical lines through the pump 32 (the same process may be used for the second chemical additive system). The priming process may be done once every day to purge the system of air or at any other predefined time.

N. Calculating Dispensed Volume of Fluid.

The control unit 30 calculates an initial volume of the first fluid within the first measuring tube 53 based on the first fluid level after the fill process and before the dosage process. The control unit 30 calculates the remaining volume of the first fluid within the first measuring tube 53 based on the first fluid level after the dosage process. The control unit 30 calculates a dispensed volume of the first fluid by subtracting the remaining volume from the initial volume. The control unit 30 calculates the initial volume and the remaining volume of the first fluid using a first density of the first fluid which is known and entered by a user. In addition, the temperature measured by the temperature sensor 42 can be utilized to determine the volume of the first fluid based on expansion and contraction of the fluid at different temperatures (i.e. the change in density).

O. Adjusting Open Time Period Based on Actual Dosage Ratio.

The control unit 30 calculates an actual dosage ratio of the first fluid added to the main fluid during the first cycle of the fill process and the dosage process. The control unit 30 compares the actual dosage ratio with a prescribed dosage ratio (set by the user as to the desired ratio of chemical to water in ppm).

If the actual dosage ratio is calculated by the control unit 30 to be less than the prescribed dosage ratio, the control unit 30 increases the open time period for a next cycle of the fill process and the dosage process which increases the amount of time that the first injection valve 52 is kept open thereby increasing the volume of first fluid dispensed from the first measuring tube 53. If the actual dosage ratio is more than the prescribed dosage ratio, the control unit 30 decreases the open time period for the next cycle of the fill process and the dosage process which decreases the amount of time that the first injection valve 52 is kept open thereby decreasing the volume of first fluid dispensed from the first measuring tube 53. If the actual dosage ratio is the same or approximately the same as the prescribed dosage ratio, then the control unit 30 keeps the open time period the same as the previous cycle.

P. Example for Adjusting Open Time Period.

For example, if the prescribed dosage ratio for the first fluid is 100 ppm with respect to the main fluid, the present invention will adjust the open time period for the open time of the first injection valve 52 until the actual dosage ratio is approximately equal to 100 ppm. To further the example, if the actual dosage ratio after the first cycle is 80 ppm for the first fluid using a 0.5 second open time period for the first injection valve 52, the control unit 30 will increase the open time period an amount of time estimated to get close to the 100 ppm such as a 0.7 second open time period for the first injection valve 52. When the second cycle occurs, the actual dosage ratio is 110 ppm using the 0.7 second open time period. The control unit 30 then recalculates the open time period to keep the first injection valve 52 open for the third cycle by lowering the open time period to 0.6 seconds. During the third cycle, the actual dosage ratio is 100 ppm using the 0.6 second open time period, so the control unit 30 continues to use 0.6 seconds for the open time period until a future deviation occurs between the actual dosage ratio and the prescribed dosage ratio. This same process is used for the second chemical additive system and any additional chemical additive systems.

Q. Warning System.

During operation of the present invention, if a condition is identified indicating the possibility of a problem such as low fluid levels in a tank 16, 58, 68, extreme fluctuations in the actual dosage ratio, a limited amount of chemical dispensed over a period of time, extreme temperatures, extreme pressures, low pressures, and the like, the control unit 30 communicates with the mobile device 14 via the telecommunications network 12 to indicate the type of problem experienced. The user with access to the mobile device 14 is thereby immediately alerted to the potential problem and may monitor the status of the system remotely or visit the site.

Any and all headings are for convenience only and have no limiting effect. Unless otherwise defined, all technical and scientific terms used herein have the same meaning as commonly understood by one of ordinary skill in the art to which this invention belongs. Although specific terms are employed herein, they are used in a generic and descriptive sense only and not for purposes of limitation. All publications, patent applications, patents, and other references mentioned herein are incorporated by reference in their entirety to the extent allowed by applicable law and regulations.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a telecommunications network, such as the Internet.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention. These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks. Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

The present invention may be embodied in other specific forms without departing from the spirit or essential attributes thereof, and it is therefore desired that the present embodiment be considered in all respects as illustrative and not restrictive. Many modifications and other embodiments of the invention will come to mind to one skilled in the art to which this invention pertains and having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although methods and materials similar to or equivalent to those described herein can be used in the practice or testing of the present invention, suitable methods and materials are described above. Thus, the present invention is not intended to be limited to the embodiments shown, but is to be accorded the widest scope consistent with the principles and features disclosed herein.

The invention claimed is:

1. A fluid metering system, comprising:
   a main tank storing a main fluid;
   a mixing unit fluidly connected to said main tank;
   a pump fluidly connected to an outlet of said mixing unit;
   a first additive tank storing a first fluid;
   a first measuring tube fluidly connected to said first additive tank;
   a first fill valve fluidly connected between said first additive tank and said first measuring tube;
   a first injection valve fluidly connected between said first measuring tube and said mixing unit; and
   a control unit in communication with said first fill valve and said first injection valve, wherein said control unit controls a state of said first fill valve and said first injection valve for a fill process and for a dosage process, wherein said control unit opens said first fill valve and closes said first injection valve during said fill process thereby filling said first measuring tube with said first fluid, and wherein said control unit closes said first fill valve and opens said first injection valve during said dosage process thereby adding said first fluid from said first measuring tube to said main fluid within said mixing unit.

2. The fluid metering system of claim 1, wherein said main fluid is comprised of water.

3. The fluid metering system of claim 2, wherein said first fluid is comprised of a water treatment chemical for treating said water prior to injection into an oil well.

4. The fluid metering system of claim 3, wherein said water treatment chemical is comprised of a scale inhibitor, a corrosion inhibitor, a desalination chemical or a biocide.

5. The fluid metering system of claim 1, wherein said mixing unit is comprised of a manifold.

6. The fluid metering system of claim 1, wherein said mixing unit is comprised of a venturi tube.

7. The fluid metering system of claim 1, wherein during said dosage process, said control unit opens said first injection valve for an open time period to release an estimated volume of said first fluid.

8. The fluid metering system of claim 7, including a first sensor fluidly connected to said first measuring tube to determine a first fluid level of said first fluid within said first measuring tube, wherein said first sensor is in communication with said control unit and transmits to said control unit said first fluid level, wherein said control unit calculates an initial volume of said first fluid within said first measuring tube based on said first fluid level after said fill process and before said dosage process, wherein said control unit calculates a remaining volume of said first fluid within said first measuring tube based on said first fluid level after said dosage process, and wherein said control unit calculates a dispensed volume of said first fluid by subtracting said remaining volume from said initial volume.

9. The fluid metering system of claim 8, including a flowmeter fluidly connected to said mixing unit and in communication with said control unit to provide a flow rate of said main fluid, wherein said control unit calculates an actual dosage ratio of said first fluid added to said main fluid during a first cycle of said fill process and said dosage process.

10. The fluid metering system of claim 1, wherein said control unit compares said actual dosage ratio with a prescribed dosage ratio, wherein said control unit increases said open time period for a next cycle of said fill process and said dosage process if said actual dosage ratio is less than said prescribed dosage ratio, and wherein said control unit decreases said open time period for said next cycle of said fill process and said dosage process if said actual dosage ratio is more than said prescribed dosage ratio.

11. The fluid metering system of claim 8, wherein said first sensor is comprised of a first pressure sensor that measures a first pressure of said first fluid within said first measuring tube.

12. The fluid metering system of claim 11, wherein said control unit calculates said initial volume and said remaining volume of said first fluid using a first density of said first fluid.

13. The fluid metering system of claim 11, wherein said first measuring tube is comprised of an upwardly angled tube.

14. The fluid metering system of claim 13, wherein said first measuring tube is vertically orientated.

15. The fluid metering system of claim 14, wherein said first measuring tube has an interior width of less than 0.5 inches and a vertical length of at least 2 feet.

16. The fluid metering system of claim 15, wherein said first measuring tube has a circular cross sectional shape, an interior diameter of approximately 0.375 inches and a vertical length of 3 feet.

17. The fluid metering system of claim 11, wherein said first pressure sensor is fluidly connected to a lower portion of said first measuring tube.

18. The fluid metering system of claim 1, including:
   a second additive tank storing a second fluid, wherein said second fluid is different from said first fluid;
   a second measuring tube fluidly connected to said second additive tank;
   a second fill valve fluidly connected between said second additive tank and said second measuring tube; and
   a second injection valve fluidly connected between said second measuring tube and said mixing unit.

19. The fluid metering system of claim 1, wherein said control unit includes a priming process, wherein said control unit opens said first fill valve and opens said first injection valve during said priming process to allow for gases to escape.

20. A fluid metering system, comprising:
   a main tank storing a main fluid;
   a mixing unit fluidly connected to said main tank;
   a pump fluidly connected to an outlet of said mixing unit;
   a first additive tank storing a first fluid;
   a first measuring tube fluidly connected to said first additive tank;
   a first fill valve fluidly connected between said first additive tank and said first measuring tube;
   a first injection valve fluidly connected between said first measuring tube and said mixing unit;
   a first sensor operatively connected to said first measuring tube and configured to determine the fluid level of said first fluid within said first measuring tube; and
   a control unit in communication with said first fill valve, said first injection valve, and said first sensor, wherein said control unit is configured to control a state of said first fill valve and a state of said first injection valve for a fill process of transferring said first fluid from said first additive tank to said measuring tube and for a dosage process of transferring said first fluid from said first measuring tube to said mixing unit;
wherein during said fill process, the control unit:
   opens said first fill valve; and
   closes said first injection valve;
wherein before said dosage process, the control unit calculates an initial volume of said first fluid within said first measuring tube using the fluid level obtained from said first sensor;
wherein during said dosage process, the control unit:
   opens said first injection valve for an open time period to release an estimated volume of said first fluid from said first measuring tube to said mixing unit; and
   closes said first fill valve; and
wherein after said dosage process, the control unit calculates a remaining volume of said first fluid within said first measuring tube using the fluid level obtained from said first sensor.

* * * * *